United States Patent Office 2,964,528
Patented Dec. 13, 1960

2,964,528

PROCESS FOR PREPARING SUBSTITUTED DI-ALKYL NITROALKYL PHOSPHATES AND THIOPHOSPHATES

Thomas H. Wicker, Jr., Marvin A. McCall, and Richard L. McConnell, Kingsport, Tenn., assignors to Eastman Kodak Company, Rochester, N.Y., a corporation of New Jersey No Drawing. Filed July 23, 1958, Ser. No. 750,320

2 Claims. (Cl. 260—294.8)

This invention relates to new organophosphorus compounds and to their method of preparation. In a specific aspect this invention relates to the preparation of new dialkyl nitroalkyl phosphates and thiophosphates from dialkyl or substituted dialkyl phosphates or phosphorothiolothionates and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl or substituted dialkyl phosphates or phosphorothiolothionates with certain nitro-olefins or alkoxynitroethylenes. The new products of this invention have the structural formula:

wherein $R_1$ and $R_2$ are selected from the group consisting of alkyl, haloalkyl (chloroethyl, chloropropyl, trichloroethyl, and the like) and alkoxyalkyl (methoxymethyl, methoxyethyl, methoxypropyl, and the like), $R_3$ is selected from the group consisting of hydrogen and alkyl, $R_4$ is selected from the group consisting of phenyl, alkoxy, alkylthio, halophenyl, nitrophenyl, thienyl, pyridyl and furyl, and X is either sulfur or oxygen. In the definition of $R_1$, $R_2$, $R_3$ and $R_4$ the alkyl and alkoxy radicals are of the lower molecular weight type and they contain 1 to 4 carbon atoms.

The compounds of this invention can be prepared by using an organophosphorus compound having the following structural formula:

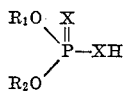

wherein $R_1$ and $R_2$ are as defined above. This organophosphorus compound is reacted with a nitroolefin having the structural formula:

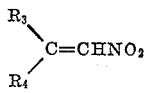

wherein $R_3$ and $R_4$ are as defined above. Alternatively the compounds of this invention can be prepared by reacting a compound having the following structural formula:

with a compound having the formula:

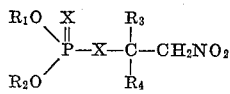

wherein $R_1$, $R_2$, $R_3$ and $R_4$ are as defined above.

The dialkyl or substituted dialkyl phosphorothiolothionates used in preparing the compounds of this invention can be readily prepared by the reaction of 4 moles of the appropriate alcohol with one mole of phosphorus pentasulfide. The nitroolefins used in practicing this invention can be prepared by the condensation of the appropriate aldehyde with a nitroalkane such as nitromethane, nitroethane, nitropropane and the like. The alkoxynitroethylenes can be prepared from orthoesters and nitromethane by the appropriate modification of the procedure described in Ber. 55, 3441 (1922).

In the practice of this invention we prefer to add one of the reactants gradually to a reactor containing the other reactant. For example, the nitroolefin can be added gradually to a reactor containing the phosphorus compound. Alternatively however, the reverse procedure of addition of reactants can be used but in those instances where polymerization of the nitroolefin is an appreciable side reaction it is preferred to add the stabilized vinyl compound to the phosphorus compound. Normally it is desirable to employ a reactor provided with adequate means of agitation and, since the reaction is quite exothermic, it is also desirable to employ a reactor that is provided with adequate cooling means.

The operable temperature range for the reaction is generally from —25 to 150° C. and the preferred temperature range is from 25 to 100° C. However, it will be realized that in some instances temperatures outside this range can be employed. The reaction time usually varies from ½ to 8 hours, but longer and shorter reaction periods are sometimes used. Normally it is unnecessary to employ a catalyst for the reaction since the dialkylphosphorothiolothionate will react with these unsaturated compounds in the absence of a catalyst. If it is considered desirable to employ a catalyst, there are certain catalysts that can be used, for example, the tertiary amines, such as triethyl amine, and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

In the reaction involving the nitroalcohols the phosphorochloridate or phosphorochloridothionate and the nitroalcohol are generally reacted in organic solvents, for example, the solvents set forth above using a tertiary amine such as triethyl amine to absorb the hydrogen chloride formed during the reaction. These reactions can also be carried out in an aqueous system using inorganic bases such as sodium hydroxide, sodium carbonate, potassium hydroxide, potassium carbonate and the like to neutralize the liberated hydrogen chloride.

The following examples are illustrative of the compounds within the scope of this invention, their method of preparation and their utility as insecticides.

*Example 1.—O,O-diethyl S-[α-(nitromethyl)benzyl] phosphorothiolothionate*

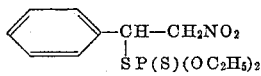

β-Nitrostyrene (0.1 mole) was added to O,O-diethyl phosphorothiolothionate with stirring. After the addition was complete and the exothermic nature of the reaction had subsided, the reaction mixture was stirred at room temperature for 1 hour, then heated on a steam bath for 15 minutes to complete the reaction. The product was vacuum stripped under 1 mm. pressure for 5–10 minutes to remove any volatile impurities. The product was a dark red oil, $n_D^{20}$ 1.5706 which had considerable anticholinesterase activity.

*Example 2.—O-ethyl, O-propyl S-[α-(nitromethyl)benzyl] phosphorothiolothionate*

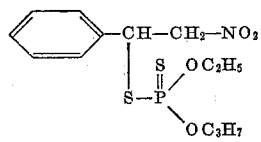

This compound was prepared according to the procedure given in Example 1 from β-nitrostyrene (0.1 mole) and O-ethyl, O-propyl phosphorothiolothionate.

*Example 3.—O,O-di-(2,2,2-trichloroethyl) S-(1-ethoxy-1-methyl-2-nitroethyl) phosphorothiolothionate*

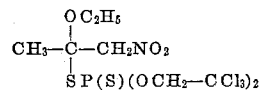

This compound was prepared according to the procedure of Example 1 from 1-nitro-2-ethoxy-1-propene (0.1 mole) and O,O-di-2,2,2-trichloroethyl phosphorothiolothionate (0.1 mole).

*Example 4.—O-ethyl, O-propyl S[1-(ethylthio)-2-nitroethyl] phosphorothiolothionate*

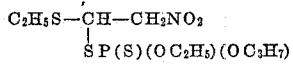

This compound was obtained from the addition of 0.1 mole of 1-nitro-2-ethylthioethylene to O-ethyl, O-propyl phosphorothiolothionate (0.1 mole) in benzene according to the procedure of Example 1.

*Example 5.—O-ethyl, O-propyl S-(-1-ethoxy-2-nitroethyl) phosphorothiolothionate*

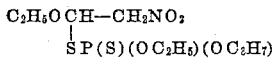

This compound was obtained by the addition of 1-nitro-2-ethoxyethylene (0.1 mole) to O-ethyl, O-propyl phosphorothiolothionate (0.1 mole) in hexane solvent.

*Example 6.—O,O-di(2,2,2-trichloroethyl) S-[α-(nitromethyl)-4-chlorobenzyl] phosphorothiolothionate*

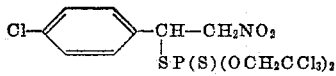

This compound was obtained by the addition of 1-(p-chlorophenyl)-2-nitroethylene (0.1 mole) to O,O-bis-(2,2,2-trichloroethyl) phosphorothiolothionate (0.1 mole) in benzene solvent.

*Example 7.—O,O-di-(2-methoxyethyl) S-[α-(nitromethyl)-3-nitrobenzyl] phosphorothiolothionate*

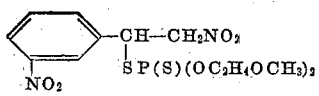

This compound was prepared by the addition of 1-(m-nitrophenyl)-2-nitroethylene (0.1 mole) to O,O-bis(2-methoxyethyl) phosphorothiolothionate in benzene solvent.

*Example 8.—O,O-diethyl S-[α-(nitromethyl)-2-chlorobenzyl] phosphorothiolothionate*

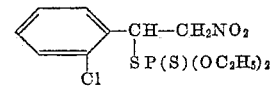

This compound was obtained from 1-(o-chlorophenyl)-2-nitroethylene (0.1 mole) and O,O-diethyl phosphorothiolothionate (0.1 mole) in benzene solvent.

*Example 9.—O,O-diethyl S-[2-nitro-1-(2-thienyl)ethyl] phosphorothiolothionate*

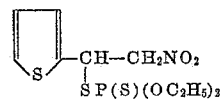

This compound was prepared from 1-(2-thienyl)-2-nitroethylene and O,O-diethyl phosphorothiolothionate in benzene solvent.

*Example 10.—O,O-diethyl S-[2-nitro-1-(3-pyridyl)ethyl] phosphorothiolothionate*

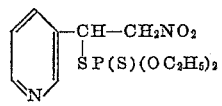

This compound was prepared by the addition of 0.1 mole of 1-(3-pyridyl)-2-nitroethylene and O,O-diethyl phosphorothiolothionate in benzene solvent.

*Example 11.—O,O-diethyl S-[1-(2-furyl)-2-nitroethyl] phosphorothiolothionate*

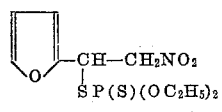

This compound was prepared by the reaction of 1-(2-furyl)-2-nitroethylene (0.1 mole) with O,O-diethyl phosphorothiolothionate.

*Example 12.—Diethyl 2-nitro-1-(2-pyridyl)ethyl phosphorothionate*

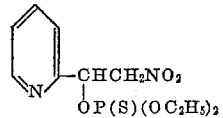

Diethyl phosphorochloridothionate (0.1 mole), pyridine (0.11 mole), and about 150 ml. of benzene were placed in a flask and stirred while α-nitromethyl-2-pyridinemethanol (0.1 mole) dissolved in a small amount of benzene was added dropwise. The reaction mixture was stirred for 4 hours and then heated gently on the steam bath for 1 hour. The precipitated pyridine hydrochloride was removed by filtration and the benzene solution was washed twice with water. After drying the benzene solution over sodium sulfate, the product was isolated by removing the benzene in vacuo.

*Example 13.—Diethyl 2-nitro-1-(4-pyridyl)ethyl phosphate*

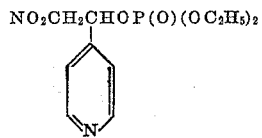

This compound was prepared from 0.1 mole of diethyl phosphorochloridate and 0.1 mole of α-nitromethyl-4-pyridinemethanol according to the procedure of Example 14 using toluene as the solvent and dimethylaniline as the base to absorb the liberated HCl.

*Example 14.—Use of compounds as insecticides*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites.

It should be noted that tests using acetone-water solutions (containing none of the toxicant) kill none of the mites.

TABLE 1

| Toxicant | Concentration of Toxicant in p.p.m. | Percent Kill of Mites |
|---|---|---|
| 1. O,O-Diethyl S-[α-(nitromethyl) benzyl] phosphorothiolothionate (Ex. 1) | 100<br>30<br>10 | 100<br>98<br>90 |
| 2. O-Ethyl, O-propyl-S(α-[nitromethyl) benzyl] phosphorothiolothionate (Ex. 2) | 100<br>30<br>10 | 100<br>92<br>92 |
| 3. O,O-Di-(2,2,2-trichloroethyl) S-(1-ethoxy-1-methyl-2-nitroethyl) phosphorothiolothionate (Ex. 3) | 100<br>30<br>10 | 100<br>95<br>90 |
| 4. O,O-Diethyl S-[2-nitro-1-(2-thienyl)ethyl] phosphorothiolothionate (Ex. 9) | 100<br>30<br>10 | 100<br>91<br>89 |

The compounds of Examples 4–8 and 10–13 were similarly effective when used in the above tests.

The compounds of this invention can be used to destroy mites, mite eggs, and aphids. In the following table the concentration of toxicant in parts per million required to kill 85% of the test insects is used and is shown as LD85.

TABLE II

| Toxicant | Insect | LD85 in p.p.m. |
|---|---|---|
| O,O-Diethyl S-[α-(nitromethyl) benzyl] phosphorothiolothionate. | mites<br>mite eggs<br>aphids | 3–4<br>10<br>2–3 |
| O,O-Diethyl S-[1-(2-furyl)-2-nitroethyl] phosphorothiolothionate. | mites | 10 |

The invention has been described in detail with particular reference to preferred embodiments thereof, but it will be understood that variations and modifications can be effected within the spirit and scope of the invention as described hereinabove and as defined in the appended claims.

We claim:
1. The method for preparing phosphorus-containing compounds which comprises reacting an organophosphorus compound having the structural formula:

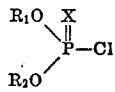

wherein $R_1$ and $R_2$ are selected from the group consisting of alkyl, haloalkyl, and alkoxyalkyl and X is selected from the group consisting of oxygen and sulfur with a nitroalcohol having the structural formula:

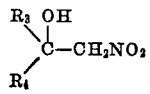

wherein $R_3$ is selected from the group consisting of hydrogen and alkyl and $R_4$ is selected from the group consisting of phenyl, alkoxy, alkylthio, halophenyl, nitrophenyl, thienyl, pyridyl and furyl, said alkyl and alkoxy radicals containing from 1–4 carbon atoms at a temperature within the range of −25 to 150° C. and for a period of time within the range of ½–8 hours.

2. The method for producing diethyl 2-nitro-1-(2-pyridyl)ethyl phosphorothionate which comprises reacting diethyl phosphorochloridothionate with α-nitromethyl-2-pyridinemethanol at a temperature within the range of −25 to 150° C. and for a period of time within the range of 0.5 to 8 hours.

References Cited in the file of this patent
UNITED STATES PATENTS

| | | |
|---|---|---|
| 2,177,757 | Vanderbilt | Oct. 31, 1939 |
| 2,526,179 | West | Oct. 17, 1950 |
| 2,706,194 | Morris et al. | Apr. 12, 1955 |
| 2,724,719 | Markley et al. | Nov. 22, 1955 |
| 2,789,124 | Gilbert et al. | Apr. 16, 1957 |
| 2,862,019 | Schrader | Nov. 25, 1958 |
| 2,889,330 | Baker | June 2, 1959 |

OTHER REFERENCES

Frear et al.: J. of Economic Entomology, vol. 40, pp. 736–741 (1947).

Norman et al.: J. Am. Chem. Soc., vol. 74, pp. 161–163 (1952).

Mel'Nikov et al.: Chem. Abstracts, vol. 48, cols. 556–557 (1954).

Gar et al.: Chem. Abstracts, vol. 48, cols. 6639–6640 (1954).